May 5, 1964 M. WATTER 3,131,789
NON-CELLULAR HONEYCOMB STRUCTURE
Filed April 26, 1961
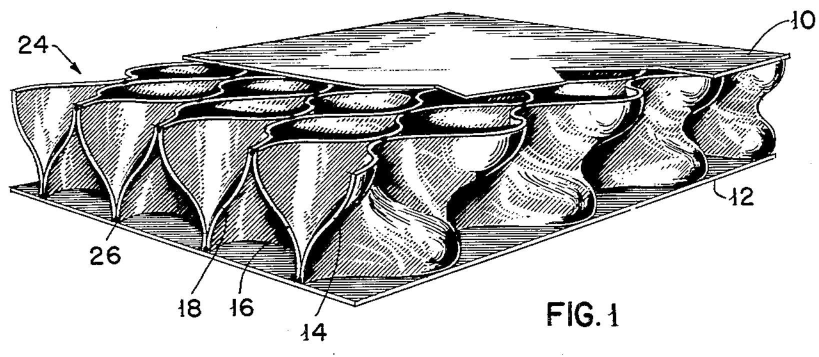
FIG. 1
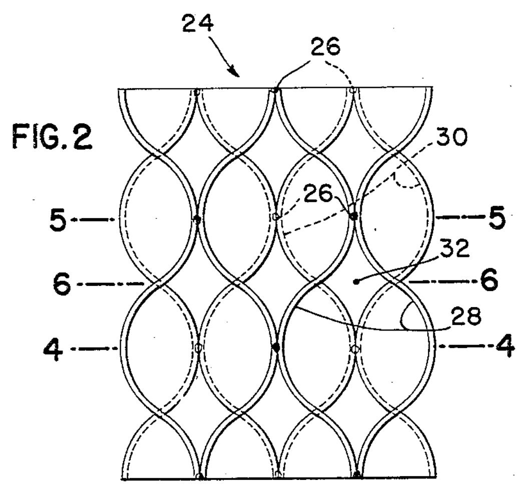
FIG. 2
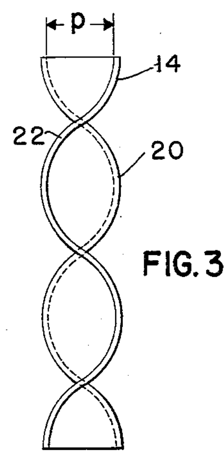
FIG. 3
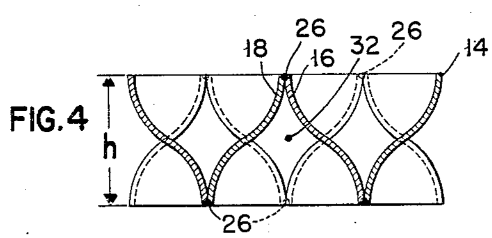
FIG. 4
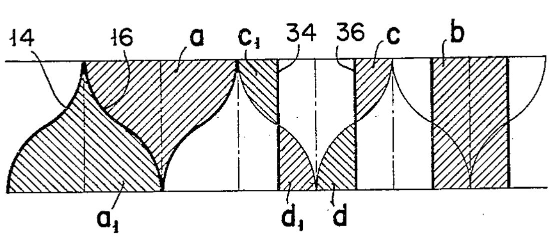
FIG. 6
FIG. 5
*INVENTOR.*
Michael Watter
*BY* John B. Sowell
*ATTORNEY*

United States Patent Office 3,131,789

Patented May 5, 1964

3,131,789

NON-CELLULAR HONEYCOMB STRUCTURE

Michael Watter, Philadelphia, Pa., assignor to The Budd Company, Philadelphia, Pa., a corporation of Pennsylvania Filed Apr. 26, 1961, Ser. No. 105,674
7 Claims. (Cl. 189—34)

The present invention relates to an improved honeycomb sandwich structure having a free flow core and more specifically to a wafer core that is easily assembled in compound curvature shapes.

Hexagonal cellular honeycomb panels are well known for their light strong structure, but such cellular type honeycomb structures are composed of a number of isolated cells. In order to braze skin sheets on such cellular cores, apertures have been provided in the cell wall to permit circulation of an inert gas or to evacuate the air space. The apertures are of necessity small to avoid weakening the cell wall and are not designed to permit the flow of a coolant should the core be fluid cooled. Such small orifice apertures would cause excessive pressure losses without complete circulation of the coolant in the core.

The assembly of both honeycomb and corrugation sandwich cores has heretofore presented a problem that required special welding mandrels if the cores are resistance welded. Some cores have been assembled by welding or brazing but they too require special jig fixtures to hold the assembly. Brazing presents additional problems in honeycomb structures for the brazing metal tends to form a continuous column of braze metal from one skin sheet to the other along the seam joints as a result of capillary action.

It is therefore a general object to provide an improved open cellular honeycomb structure without continuous seam joints interconnecting skin sheets.

Another object is to provide an open cellular core sandwich panel having a constant cross-section free-flow area.

A further object is to provide a strong rigid sandwich panel with improved insulation qualities.

A further object is to provide a sandwich core structure that may be resistance welded into an assembly without welding mandrels.

A further object is to provide a sandwich core panel that may be brazed together in a single operation.

A further object is to provide a flexible core for a rigid sandwich panel that may be joined into compound shapes.

A further object is to combine the stiffness and strength of a honeycomb structure in a compound curvature structure that is neither a vertical corrugation or horizontal corrugation.

Sandwich panels constructed in accordance with the invention may in general comprise, a lower skin sheet and an upper skin sheet, a plurality of intermediate compound curvature core sheets having alternately raised and lowered shapes, said core sheets being welded together at alternate mating shapes to provide a free flow area therebetween, and means for attaching the edges of the core sheets to said upper and lower skin sheets whereby the skin sheets are connected to the core sheets to form a sandwich panel.

Other features and objects of the invention will be found throughout the more detailed description of the invention which follows. Those novel features believed to be descriptive of the nature of the invention are described with particularity in the appended claims. To more clearly portray the invention and its manner of operation the description is supplemented with the accompanying drawings:

FIG. 1 is a perspective view of a portion of the sandwich panel.

FIG. 2 is a plan view of the core assembly.

FIG. 3 is a plan view of a single core strip.

FIG. 4 is a section in elevation of the core assembly cut along line 4—4.

FIG. 5 is a section in elevation of the core assembly cut along line 5—5.

FIG. 6 is a composite section of the core assembly illustrating the constant flow area.

Referring now more in detail to FIG. 1 of the drawing wherein the sandwich panel structure is composed of two skin sheets 10 and 12, and a plurality of core strips like 14, 16 and 18. The single core strip 14 of FIG. 3 shows the symmetric alternate disposed raised and lowered approximately hemispherical shapes 20 and 22 of a preferred geometric configuration. A plurality of such cores may be welded together one at a time to build up a core assembly 24. It is intended that the core strips be thin and bendable so that they may be bent to conform to the compound curvature of a desired pattern such as a wing or fuselage panel. Assembly of the core is greatly simplified by welding the alternate raised and lowered shapes at the mating point of two adjacent strips by weld points 26.

Usually the core assembly 24 is welded together at the mating points of the core strips which (as assembled) are assembled as reflected images of each other. As will be explained later the novel core structure permits the insertion of welding electrode fingers into the core assembly to weld mating points intermediate the two skin sheets.

Weld points 26 may be made by rodless fusion welding or resistance welding for the hollow core structure permits ample access to all weld points before the skin sheets 10 and 12 are attached. The opening 28 and the opening 30 are connected by diagonal interconnecting apertures 32 which allow the insertion of finger electrodes to make resistance welds 26. This is especially advantageous when the depth "*h*" (FIG. 4) of the core strip is doubled, or greater, causing mating points of the alternate disposed shapes to occur intermediate the edges where the skin sheets are attached.

After the core structure 24 is welded together or attached by adhesive means the skin sheets 10 and 12 may be attached. A preferred method of attaching metal skin sheets to metal core sheets is by brazing. Since the core structure 24 has free flow areas between the skin sheets, brazing of the skin sheets to the core assembly may be accomplished in an evacuated or an inert atmosphere without any modification to the core structure. Compound curvature sandwich core structures may be made in a similar manner as a flat core assembly by first assembling core structure 24 as a flat assembly and then filling the core cavities with Cerrobend or a similar supporting filler material, then shaping the core assembly by conventional forming methods and later removing the Cerrobend filler. In forming compound curvature sandwich structures the skin sheets 10 and 12 may be preformed and attached to the core assembly by brazing or other methods. If the core assembly is made of a thermal plastic or other material which may be postformed there is no requirement for a filler material or preforming of the skin sheets. Once the skin sheets are attached to the core assembly there are isolated free flow passages between alternate core strips 14 and 16; 16 and 18 etc. Baffles or enclosures may be attached at the ends of the sandwich structure to provide flow chambers for fluids. FIG. 4 is a section cut along line 4—4 of FIG. 2, while FIG. 5 is a section cut along line 5—5 of FIG. 2. The space separating core strips 14 and 16 represents the through-flow passage at the two sections. Moving from section 4—4 to section 5—5 the edges of the core strips at the top of the core assembly gradually converge while the edges of the core strips at the bottom of the core assembly gradually diverge until the pattern made by core strips 14 and 16 in FIG. 4 have become an inverted pattern as shown in FIG. 5. At some intermediate section, 6—6 between the two sections 4—4 and 5—5 the core strips 14 and 16 appear as vertical lines in sectional elevation.

Core strips like 14, 16 and 18 may be formed over dies having hemispherical balls protruding from the face of the die. When two such dies are intermeshed to a depth "$p$" into a flat sheet inserted between the dies, a core strip like that shown in FIG. 3 will result. Hemispherical shaped core strips when combined into core assemblies, may be made into sandwich structures of greater structural uniformity than corrugated core panels, and in addition, for reasons given below, of superior thermal insulating properties. Compression loads placed on such sandwich structures would not have directional properties which characterize the ultimate crushing strength of sandwich panels which have directionally oirented cores. Not only does the core provide an extremely strong and light weight sandwich structure but the panel is devoid of any vertical seams which would act as capillary tubes and fill with braze metal should the sandwich core be brazed, thus adding weight and heat conduction between skin sheets. Brazing metal and fluxes tend to concentrate only at the mating surfaces of the skin sheets and the edges of the core strips, which is not true of honeycomb cores having vertical seams interconnecting the skin sheets. Isolation of the brazed metal at the surface of the skin sheets provides a superior insulation structure for there are no thorough-metal areas of highly conductive braze metal to form a thermal conductive path between skin sheets.

FIG. 6 illustrates the constant flow area characteristics of the novel sandwich structure. Area "$a_1$" is formed intermediate two adjacent core strips like 14 and 16 and is identical in shape and size to the inverted area "$a$" adjacent thereto between two core strips. If a section is cut along line 6—6 (FIG. 2) the two adjacent core strips 34 and 36 appear as vertical lines. The areas "$c$" and "$c_1$" have been removed from what was formerly area "$a$" but two identical areas "$d$" and "$d_1$" have been added to what was formerly area "$a$" to provide an area intermediate two core strips which is equal to area "$b$." At each successive point along the core assembly sections may be cut which will illustrate that areas like "$c$" and "$c_1$" taken from area "$a$" are always compensated for by areas "$d$" and "$d_1$" which are added to the area "$a$," thus, always providing a continuous and equal cross-sectional through-flow area along the corridor intermediate two adjacent core strips.

It will be noted in FIGS. 4 and 5 that the welds 26 of the core structure occur at the edges of the core strips where the skin sheets are attached. When the core structure is to be assembled by brazing means, the skin sheets may be applied to a plurality of core strips held in a jig structure and a complete assembly brazed at one time joining the core strips and the skin sheets into a complete sandwich structure without the requirement for welding.

Structures made from translucent or transparent plastic material provide very attractive grills or suspended ceiling structures which exhibit superior strength characteristics. Structures made from high tensile strength stainless steel in addition to being effective structures provide desirable through-flow areas without having any metal removed from the core strips, and are further desirable in that such core assemblies are more easily fabricated by conventional methods without elaborate tooling.

It is to be understood that various modifications and changes may be made in the arrangement of the novel alternate disposed hemispherical shapes. For example, rectangular and triangular interconnecting patterns may be substituted for the alternate disposed hemispherical shapes. Such structures may be used in combination with the novel sandwich structure without departing from the scope of my invention some of the novel features of which are defined in the appended claims.

What is claimed is:

1. In a modified honeycomb sandwich structure a plurality of compound curvature core strips, said core strips being connected to each other at point contacts of said compound curved surfaces, said core strips being connected together to form constant cross-section areas between adjacent strips, and a pair of reinforcing sheets extending generally normal to said abutting points attached to the edges of said core strips to form a sandwich panel.

2. In a modified honeycomb sandwich structure a plurality of vertical core strips, said strips forming symmetrical compound curvature shapes from flat strips alternately disposed from a vertical axis of said strips, said core strips being connected to each other at point contacts of said compound curvature shapes to form interconnecting constant cross-section areas therebetween, and a pair of reinforcing skin sheets attached to said core strips generally normal to said vertical axis.

3. A non-cellular sandwich structure comprising, an upper and a lower horizontal skin sheet, a plurality of longitudinal web strips of a compound undulation form connected together as reflected images to form a core section, and means for connecting said skin sheets to said core section at the edges of said web strips to form a sandwich structure having constant cross-section free flow areas between said skin sheets and said web strips.

4. A sandwich panel structure comprising, a pair of horizontal reinforcing skin sheets and a plurality of individual compound curvature longitudinal strips interposed therebetween, said strips being symmetrical in shape about their longitudinal axis and forming point contact with adjacent strips at their compound surfaces, and adhesive means for bonding said strips and said sheets together along the edges of said strips to form a sandwich panel.

5. A sandwich structure comprising, parallel skin sheets and transverse connecting web sheets secured at opposite edges to said parallel skin sheets, said web sheets being formed with a sinuous configuration along their length in planes parallel to said skin sheets, the sinuous configurations of said web sheets in vertically spaced planes between the skin sheets varying in amplitude from the central axis of the web sheets and forming passages between said web sheets having a sinuous form in vertical planes.

6. A sandwich structure as set forth in claim 5, in which adjacent web sheets have mating opposed formations.

7. A composite sheet structure comprising, a plurality of transversely connected longitudinally alternately twisted web members, each said web member formed as compound curvature shapes varying in amplitude from their neutral longitudinal axis, and means for connecting said webs at mating points of maximum amplitude to form a composite sheet structure.

References Cited in the file of this patent

UNITED STATES PATENTS

| | | |
|---|---|---|
| 735,335 | Bird | Aug. 4, 1903 |
| 2,609,068 | Pajak | Sept. 2, 1952 |
| 2,963,128 | Rapp | Dec. 6, 1960 |